(12) United States Patent
Peltz (10) Patent No.: US 9,650,261 B2
(45) Date of Patent: May 16, 2017

(54) MODIFIED BIOCHAR TREATMENT MEDIA, SYSTEM AND METHOD

(71) Applicant: BIOCHAR NOW, LLC, Loveland, CO (US)

(72) Inventor: Christopher Dale Peltz, Silverton, CO (US)

(73) Assignee: BIOCHARNOW, LLC, Loveland, CO (US)

( * ) Notice: Subject to any disclaimer, the term of this patent is extended or adjusted under 35 U.S.C. 154(b) by 0 days.

(21) Appl. No.: 14/428,780

(22) PCT Filed: Oct. 10, 2013

(86) PCT No.: PCT/US2013/064333
§ 371 (c)(1),
(2) Date: Mar. 17, 2015

(87) PCT Pub. No.: WO2014/059141
PCT Pub. Date: Apr. 17, 2014

(65) Prior Publication Data
US 2015/0232349 A1  Aug. 20, 2015

Related U.S. Application Data

(60) Provisional application No. 61/712,678, filed on Oct. 11, 2012.

(51) Int. Cl.

| | | |
|---|---|---|
| *B01J 20/32* | (2006.01) | |
| *C02F 1/28* | (2006.01) | |
| *B09C 1/00* | (2006.01) | |
| *B01J 20/20* | (2006.01) | |
| *B01J 20/06* | (2006.01) | |
| *B01J 20/28* | (2006.01) | |
| *B01J 20/30* | (2006.01) | |
| *C02F 103/10* | (2006.01) | |
| *C02F 101/20* | (2006.01) | |
| *C02F 103/06* | (2006.01) | |

(52) U.S. Cl.
CPC ............... *C02F 1/283* (2013.01); *B01J 20/06* (2013.01); *B01J 20/20* (2013.01); *B01J 20/28011* (2013.01); *B01J 20/3071* (2013.01); *B01J 20/3078* (2013.01); *B09C 1/00* (2013.01); *B09C 2101/00* (2013.01); *C02F 2101/20* (2013.01); *C02F 2101/203* (2013.01); *C02F 2103/06* (2013.01); *C02F 2103/10* (2013.01)

(58) Field of Classification Search
CPC .................................. B01J 20/32; B01J 20/26
USPC ................................................... 502/402, 414
See application file for complete search history.

(56) References Cited

U.S. PATENT DOCUMENTS

| | | | | |
|---|---|---|---|---|
| 2,683,675 | A | * | 7/1954 | Machlet .................. C23C 10/34 106/1.25 |
| 4,737,358 | A | | 4/1988 | Suzuki |
| 6,989,102 | B1 | | 1/2006 | Park et al. |
| 2005/0061712 | A1 | | 3/2005 | Nicolaos et al. |

FOREIGN PATENT DOCUMENTS

| | | |
|---|---|---|
| KR | 10-0268128 | 7/2000 |
| KR | 10-2000-007403 | 12/2000 |

OTHER PUBLICATIONS

International Search Report for co-owned PCT Patent Application No. PCT/US2013/064333; dated Oct. 10, 2013, 11 pages.
International Preliminary Search Report for co-owned PCT Patent Application No. PCT/US2013/064333, dated Dec. 27, 2013, 7 pages.
Taylor, Paul, McLaughlin, Hugh and Flannery, Tim, "The Biochar Revolution: Transforming Agriculture & Environment," Paperback—Dec. 1, 2010, see Chapter 8, "Characterizing Biochars", 5 pages.

* cited by examiner

*Primary Examiner* — Edward Johnson
(74) *Attorney, Agent, or Firm* — Trenner Law Firm, LLC; Mark D. Trenner (57) ABSTRACT

A treatment media, system, and method are disclosed which combines adsorptive capacity of a carbon media (e.g., biochar) with chemical treatment characteristics of a red mud substance, e.g., to remove metals and/or other contaminants from waters. The treatment media may also improve biological conditions of affected soils. In an example treatment method, a lignin based material is thermo-chemically decomposed to have a large weight fraction of carbon (e.g., the biochar), and an ore is processed to yield aluminum oxide comprising a variety of iron oxides and having high alkalinity in slurry (e.g., the red mud). The thermo-chemically decomposed lignin based material is combined with the mud material.

14 Claims, 10 Drawing Sheets

MODIFIED BIOCHAR TREATMENT MEDIA, SYSTEM AND METHOD

PRIORITY CLAIM

This application claims the benefit of U.S. Provisional Patent Application No. 61/712,678 titled "Modified biochar for treatment of acid and mineralized water and soil," of Peltz and filed Oct. 11, 2012, hereby incorporated by reference for all that is disclosed as though fully set forth herein.

BACKGROUND

Remotely located mineral production sites are frequently abandoned when no longer economically viable. The sites may be associated with acid mine drainage to lands and water bodies. Thousands of acres and many miles of lakes and streams are affected each year by acid mine drainage in the United States alone, and many more acres throughout the world. It may be necessary to remediate these areas, but there are few practical treatment options.

Active treatment technologies require constant and continuous monitoring and adjustment of treatment processes, sludge production, de-watering, transport, and final deposition of removed material.

Passive treatment of acid mine drainage waters and metal laden sites has gained interest in the past decade, with many studies examining the efficacy of constructed wetlands and anaerobic digestion.

DETAILED DESCRIPTION

Modified biochar treatment media, system, and method are disclosed. In an example, the modified biochar treatment media includes a biochar fraction in combination with red mud fraction. The modified biochar may be used, e.g., for remediation of degraded and mining affected sites. For example, the modified biochar may be used in constructing passive reactive systems to reduce the metal load of mining affected waters and to increase the pH of these waters.

In an example, the biochar fraction of the modified biochar treatment media may be produced by thermo-chemically decomposing a lignin-based material to have a large weight fraction of carbon. Although no particular process for producing the biochar is required, example production of biochar suitable for the modified biochar treatment media described herein have been presented in co-owned, co-pending PCT patent applications PCT/US2013/025999 and PCT/US2013/030079, hereby incorporated by reference for all that is disclosed as though fully set forth herein.

Also in an example, the red mud fraction of the modified biochar treatment media may be produced by processing an ore to yield aluminum oxide and a red mud material comprising a variety of iron oxides and having high alkalinity in slurry. Bauxite may be produced during alumina production processes. Again, while no particular process for producing the red mud is required, example production of red mud may be produced according to the Bayer Process. When using the Bayer Process, bauxite is the insoluble product after digestion with sodium hydroxide at elevated temperature and pressure. Red mud is a mixture of compounds originally present in the parent mineral, bauxite, and compounds formed or introduced during the Bayer Cycle. Red mud may be produced as a slurry having a solids concentration in the range of 10-30%, pH in the range of 12-14 and a high ionic strength.

In another example, red mud may be produced as a primary product or by-product of the Confederate Process. The effect of red mud products from the Confederate Process may differ from Bayer process red mud materials.

The treatment media may be produced by combining the thermo-chemically decomposed lignin based material (e.g., biochar) with the red mud material to form a matrix that can remove a contaminant from water by combining the adsorptive capacity of a carbon filter with the chemical treatment characteristics of red mud. The treatment media utilizes the porous nature of biochar and the specific affinity of biochar to adsorb metals such as (but not limited to) iron, cadmium, and zinc. The red mud fraction provides chemisorptive properties, and due at least in part to its high pH (e.g., greater than about pH 11), also precipitates metals in solution as the pH of the solution is increased. These and other advantages of the treatment media will be readily apparent to those having ordinary skill in the art after becoming familiar with the teachings herein.

Before continuing, it is noted that as used herein, the terms "includes" and "including" mean, but is not limited to, "includes" or "including" and "includes at least" or "including at least." The term "based on" means "based on" and "based at least in part on."

Figure 1:
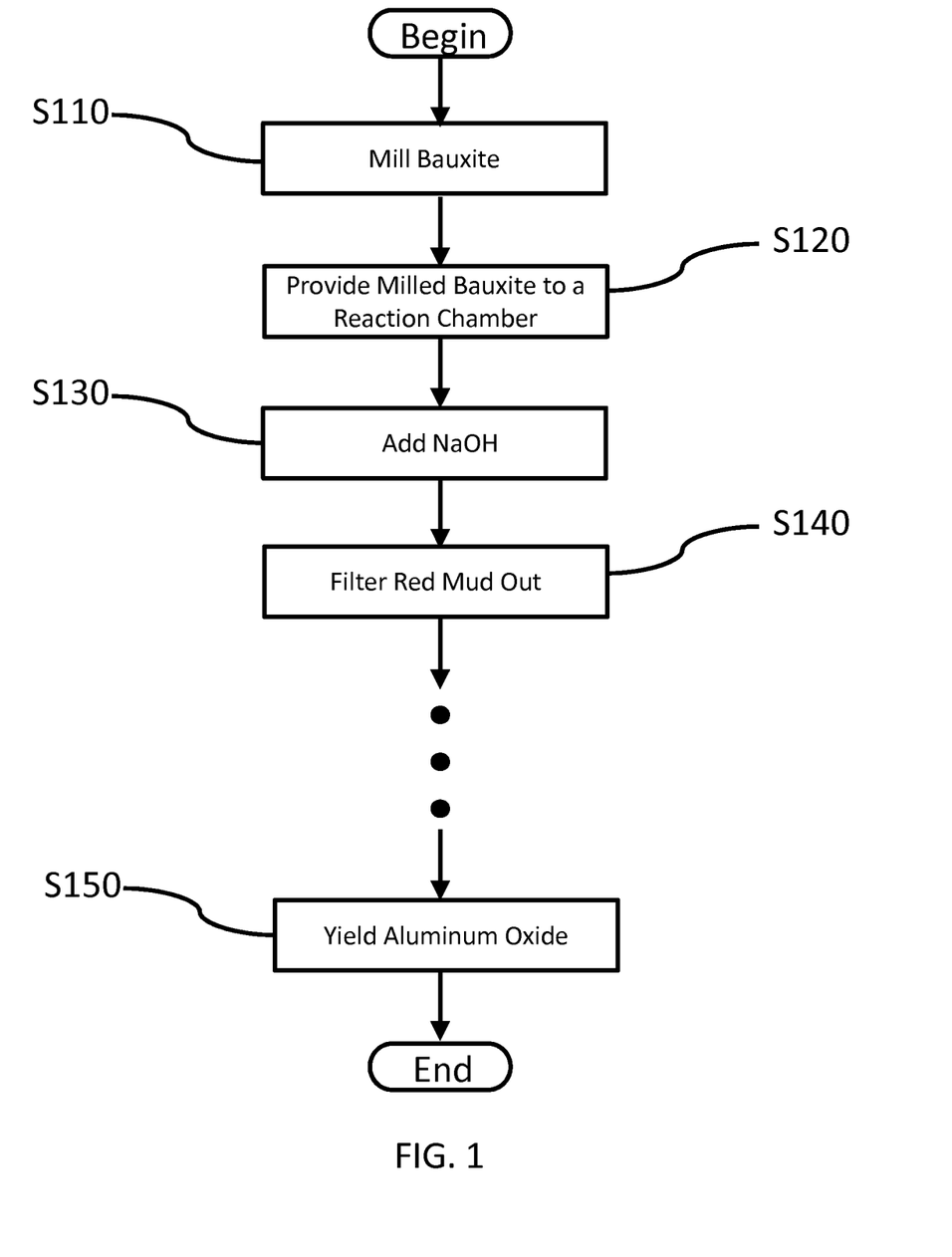
FIG. 1 illustrates an example red mud production process.

As introduced above, the treatment media described herein may be produced by combining biochar with red mud to form a matrix. The red mud fraction may be produced according to any of a variety of suitable production processes. FIG. 1 illustrates an example red mud production process. In this example, a bauxite ore may be processed to yield aluminum oxide and a slurry comprising a variety of iron oxides. Bauxite is typically strip mined from near the ground surface, crushed and milled (e.g., as illustrated by step S110). The milled bauxite and NaOH are provided to a reaction chamber in steps S120 and S130 to produce Na[Al(OH)$_4$]. After reacting, a red mud material is filtered from the Na[Al(OH)$_4$]. While the process goes on to yield aluminum oxide according to a step S150, the red mud may be harvested for use in the treatment media described herein. In an example, the mud material may be prewashed before use in the treatment media.

Red mud may be comprised mainly of a mixture of solid and metallic oxide-bearing impurities with a variety of elements and mineralogical phases, and may have a relatively high specific surface area and a fine particle size distribution. An example of the red mud used for the treatment media described herein may include silica, aluminum, iron, calcium, titanium, and may also include an array of minor constituents, such as but not limited to sodium, potassium, chromium, vanadium, nickel, barium, copper, manganese, lead and zinc.

In an example, the red mud used for the treatment applications described herein may have a composition characterized by at least 50% by weight $Fe_2O_3$; at least 5% by weight CaO; less than 15% by weight $Al_2O_3$; less than 15% by weight $SiO_2$; less than 5% by weight $Na_2O$; and less than 10% by weight $TiO_2$. For example, as a cancrinite framework, red mud has a low silica ($SiO_2$) content. However, exact chemical compositions of the red mud may vary based on design considerations (e.g., desired removal characteristics). Red mud may also be comprised of from about 7% to about 50% by weight $Fe_2O_3$; from about 7% to about 28% by weight $Al_2O_3$; from about 2% to about 20% by weight $SiO_2$; from about 1% to about 10% by weight $Na_2O$; and from a trace amount to about 28% by weight $TiO_2$.

The red mud produced according to the processes described herein may have chemiosorptive properties, e.g., metal diffusion into the lattice of iron and aluminum oxides. These properties yield a highly durable reduction in metal mobility. Furthermore, due to its high pH (e.g., greater than about pH 11), the red mud facilitates precipitation of metals in solution by increasing the solution pH.

Figure 2:
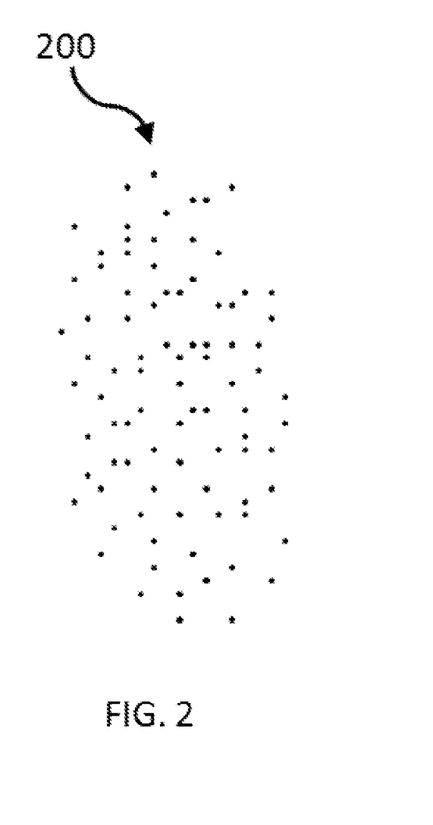
FIG. 2 illustrates an example red mud material.

FIG. 2 illustrates an example red mud material 200 in powder or granular form. However, the red mud used herein as part of the modified biochar treatment media may be provided in any of a variety of forms, including for example, but not limited to a high-alkalinity slurry, pellets or a combination of these.

The biochar fraction of the treatment media described herein may be produced according to any of a variety of suitable production processes. Biochar, as the term is used herein, is a high-carbon, fine-grained product of the direct thermal decomposition of biomass at elevated temperatures in an oxygen deprived environment. This process of direct thermal decomposition in a low- to no-oxygen environment (sometimes referred to as pyrolysis) yields a pure biochar product suitable for use with the treatment media described herein.

Figure 3:
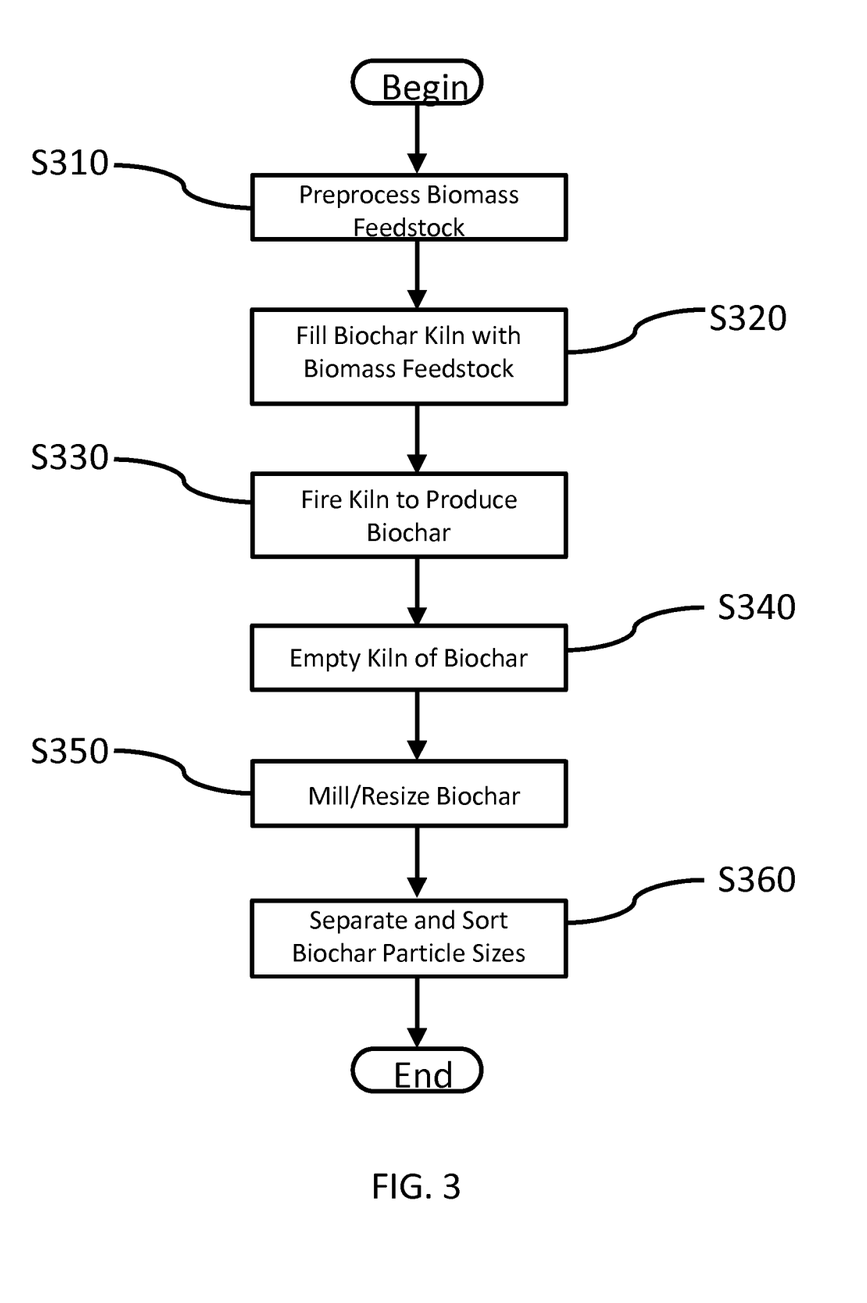
FIG. 3 illustrates an example biochar production process.

FIG. 3 illustrates an example biochar production process using, as biomass feedstock, a lignin based material or other organic polymer or biopolymer. In an example, a lignin based material is thermo-chemically decomposed to produce a product having a large weight fraction of carbon. At step S310, a lignin based material, organic polymer or biopolymer may be preprocessed (e.g., by cutting, splitting, milling or a combination of these).

In step 320, a kiln is filled with the preprocessed biomass feedstock. The kiln is then fired to convert feedstock into biochar at step S330. The biochar fraction may be produced by heating the biomass feedstock in a low or even no oxygen environment. Limited oxygen prevents combustion and instead of simply burning the biomass, converts the biomass to a structured biochar product exhibiting high porosity and affinity for adsorption of iron, cadmium and zinc. In some examples, thermo-chemical decomposition may continue until the lignin based material as a biochar product is 80% or more carbon by weight fraction and has very high microporosity.

In an example, the biochar product has a Brunauer, Emmett and Teller (BET) surface area or specific surface area of at least 250 $m^2/g$. In another example, the BET surface area of biochar may exceed 500 or even 750 $m^2/g$. The quality and quantity of yield is dependent at least in part on type and supply of biomass, and various process parameters. Experiments have shown that the BET specific surface area of biochar product increases sharply with increase in pyrolysis temperature between approximately 300 and approximately 500 degrees Celsius, and continues to increase up to approximately 700 degrees Celsius. However, higher temperatures may also be used. After fire suffocation and cooling, the kiln may be emptied of biochar according to step S340.

According to a step S350, the biochar yielded from thermo-chemical decomposition is then processed to obtain a uniform size fraction. Processing may be by any of a variety of means according to the desired size of the biochar. In some examples, size may be between approximately 2 mm and approximately 5 mm in diameter. Processing may include but is not limited to crushing, milling or a combination of these. In step S360 biochar is sorted or screened into sizes.

Figure 4:
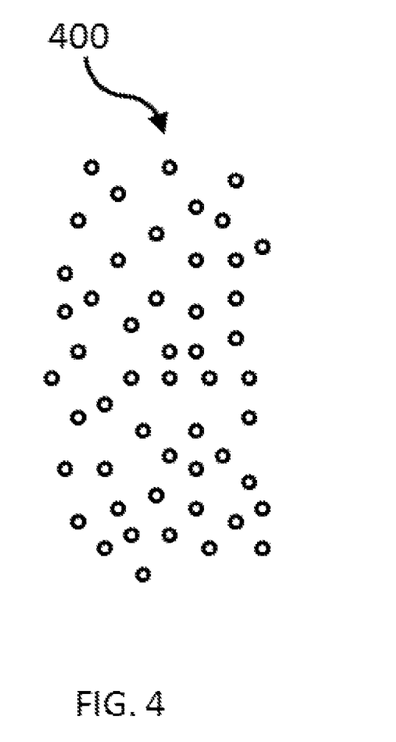
FIG. 4 illustrates an example biochar media.

FIG. 4 illustrates an example biochar 400. Biochar production may take place at the same location red mud material is produced, and/or at a remote location. When produced at a location remote from the red mud material, biochar may be bagged then loaded (e.g., onto palettes or into shipping containers) and readied for delivery (e.g., loaded onto trailers) according. Haulers may leave the site to ship biochar to customers.

Figure 5:
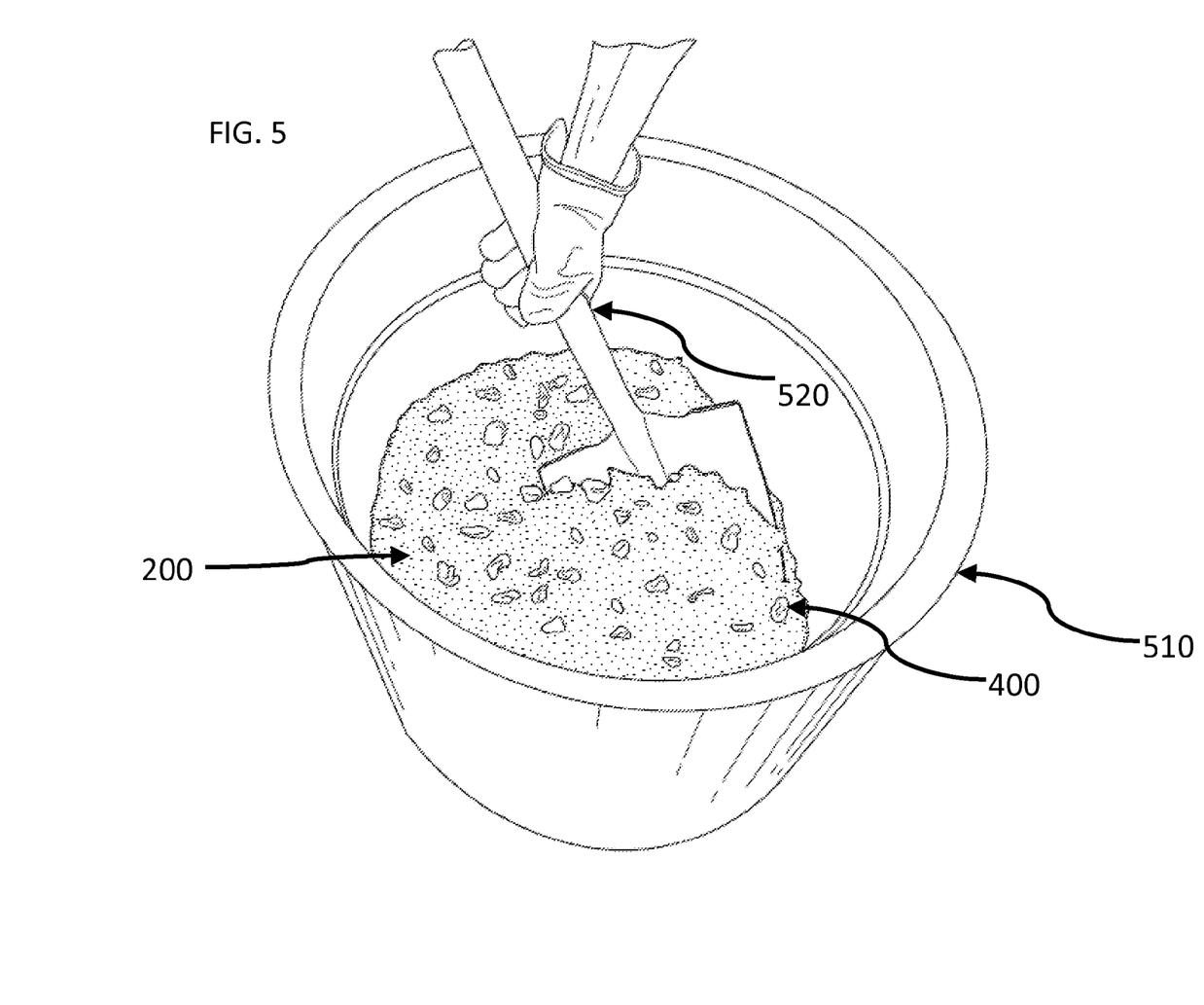
FIG. 5 illustrates example mixing of biochar with red mud.

The biochar yielded by thermo-chemical decomposition of the lignin based material may be combined with the mud material to form a matrix. In an examples the biochar and the red mud material are combined by mechanically mixing or stirring. FIG. 5 illustrates mixing of biochar 400 with red mud 200 using a container 510 and a shovel 520. Any suitable mixing process and/or system may be employed.

Figure 6:
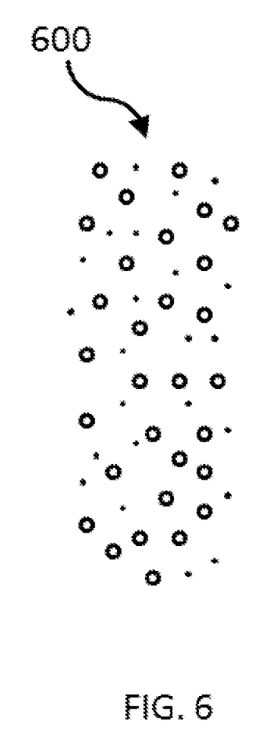
FIG. 6 illustrates an example of biochar media combined with a red mud material to form an example matrix.

FIG. 6 illustrates a red mud fraction combined with a porous adsorptive biochar fraction to produce a treatment media 600. Treatment media 600 may be used in a treatment system. The treatment system may be configured, e.g., to remove heavy metals and/or other contaminants from water and/or other environments, and to improve the biological conditions of affected soils.

In an example, the treatment media provides a sorbent and chemical precipitant. That is, the media is configured to bind with one or more contaminant such as metal(s) (e.g., aluminum (Al), cadmium (Cd), copper (Cu), iron (Fe), lead (Pb), manganese (Mn), and zinc (Zn)) to effectively remove these contaminants from liquids such as low-pH waters (e.g., having a pH of less than about 5). In combination, the biochar and red mud are configured to continue to reduce metal concentrations of total metals until both the adsorptive capacity of the biochar and surface reactivity of the red mud are exhausted and treatability is reduced to zero.

In an example, the treatment media has a mass ratio of approximately one part biochar fraction to one part red mud fraction whereas, in other examples, the media has a mass ratio of approximately two parts biochar fraction to one part red mud fraction. However, other ratios may also be used and the exact combination of biochar and red mud may depend at least to some extent on design parameters (e.g., the concentrations of metals in the waters to be treated).

Table 1 below, illustrates that after 7 days of fluid flow, total metals concentrations in example soil columns varying in biochar concentration from 10% to 100%. In this example, compositions lower in biochar removed relatively more manganese, iron, and silicon; while compositions higher in biochar removed relatively more aluminum, cadmium, copper and zinc.

TABLE 1

Total Metals Concentrations (mq/L)

| Analytes | Inflow | 100% Biochar | 50% Biochar | 30% Biochar | 20% Biochar | 10% Biochar |
|---|---|---|---|---|---|---|
| Al | 12.90 | 14.0 | 7.55 | 2.48 | 3.67 | 0.04 |
| Cd | 0.021 | 0.020 | 0.017 | 0.014 | 0.013 | 0.009 |
| Cu | 0.07 | 0.07 | 0.06 | 0.02 | 0.06 | 0 |
| Fe | 29.5 | 6.40 | 61.9 | 78.2 | 51.1 | 93.6 |
| Mn | 0.95 | 1.04 | 1.48 | 1.82 | 1.46 | 2.82 |
| S | 68.0 | 66.0 | 74.0 | 76.0 | 56.5 | 80.0 |
| Zn | 1.33 | 1.35 | 1.05 | 0.72 | 0.34 | 0.16 |

In an example, the red mud fraction of the treatment media may have a density greater than about 3.4 g/cm$^3$. In another example, the biochar fraction may have a specific density less than about 1 g/cm$^3$, and a mean diameter greater than about 2 mm and less than about 4 mm. The treatment media has an increasingly strong bond, as the metal(s) and reacts with any remaining contaminants not chemiosorbed.

Before continuing, it should be noted that the examples described above are provided for purposes of illustration, and are not intended to be limiting. Other devices and/or device configurations may be utilized to carry out the operations described herein.

The combined red mud and biochar media or matrix may be provided as part of or otherwise incorporated into active and passive treatment systems. The media may be used in continuous flow chambers and batches. Additionally, as part of a passive reactive barrier, the media may provide for surrounding and arresting metal contamination in groundwater as a component of metals dams. In some examples, the treatment system structure may include one or more contact columns in series, parallel or a combination of these.

To accomplish remediation concentration goals downgradient of a contaminated plume, a permeable reactive barrier including the treatment media may be used. In an example, the contaminated plume is intercepted by the reactive treatment media placed in the sub-surface, such that flow through the treatment media transforms contaminants into more environmentally acceptable states.

Figure 7:
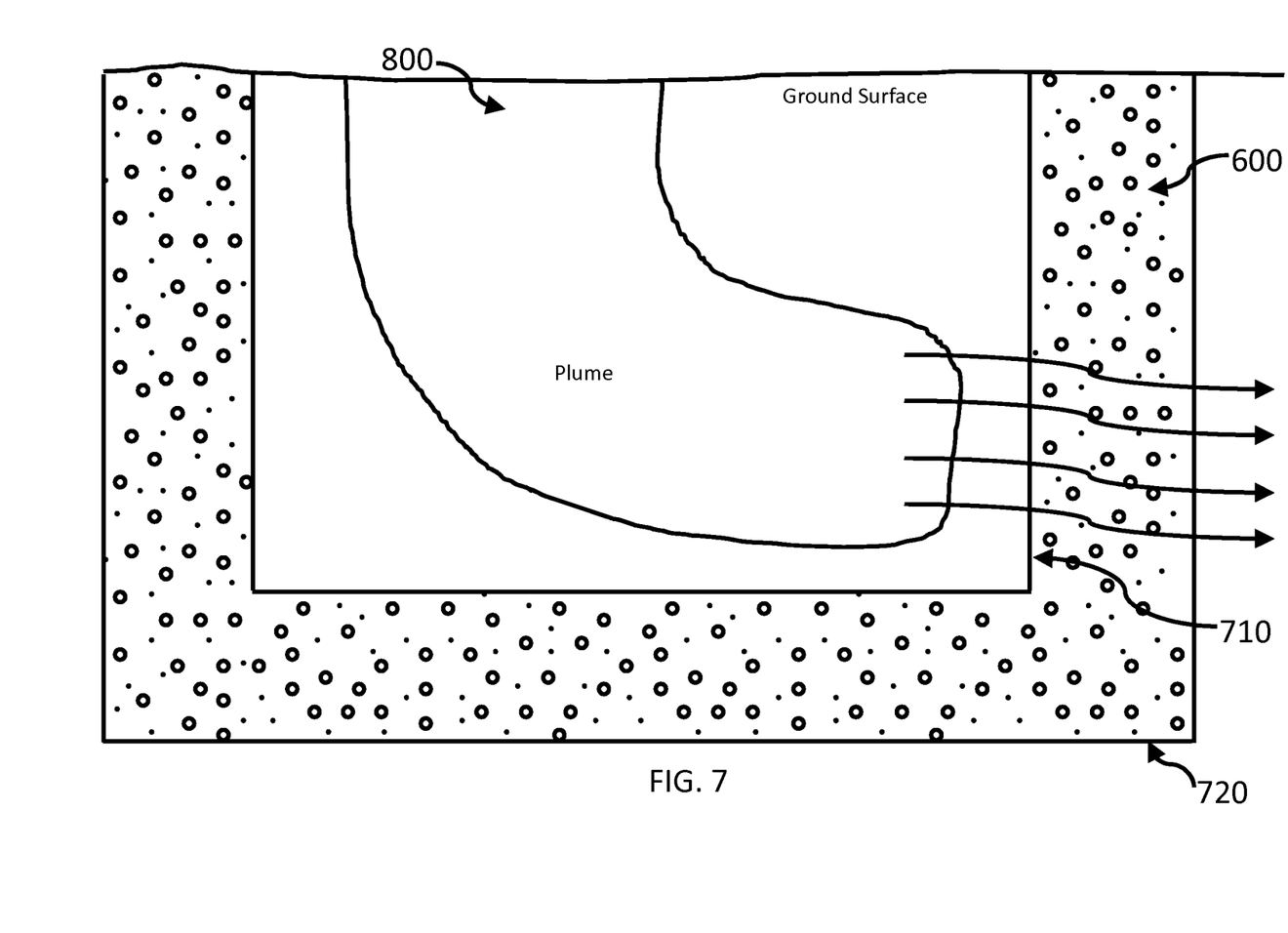
FIG. 7 illustrates an example metals dam surrounding a plume implementing the treatment media described herein as a treatment system.
Figure 8:
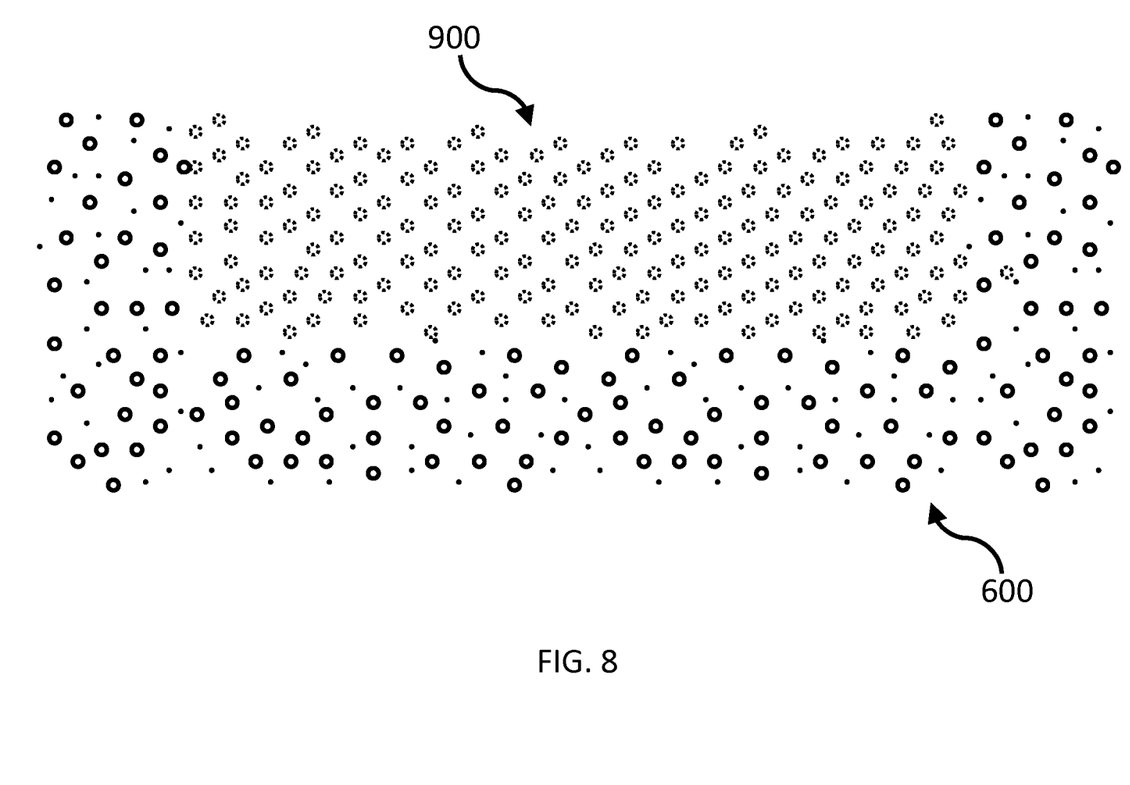
FIG. 8 illustrates an example metals dam surrounding tailings implementing the treatment media described herein as a treatment system.
Figure 9:
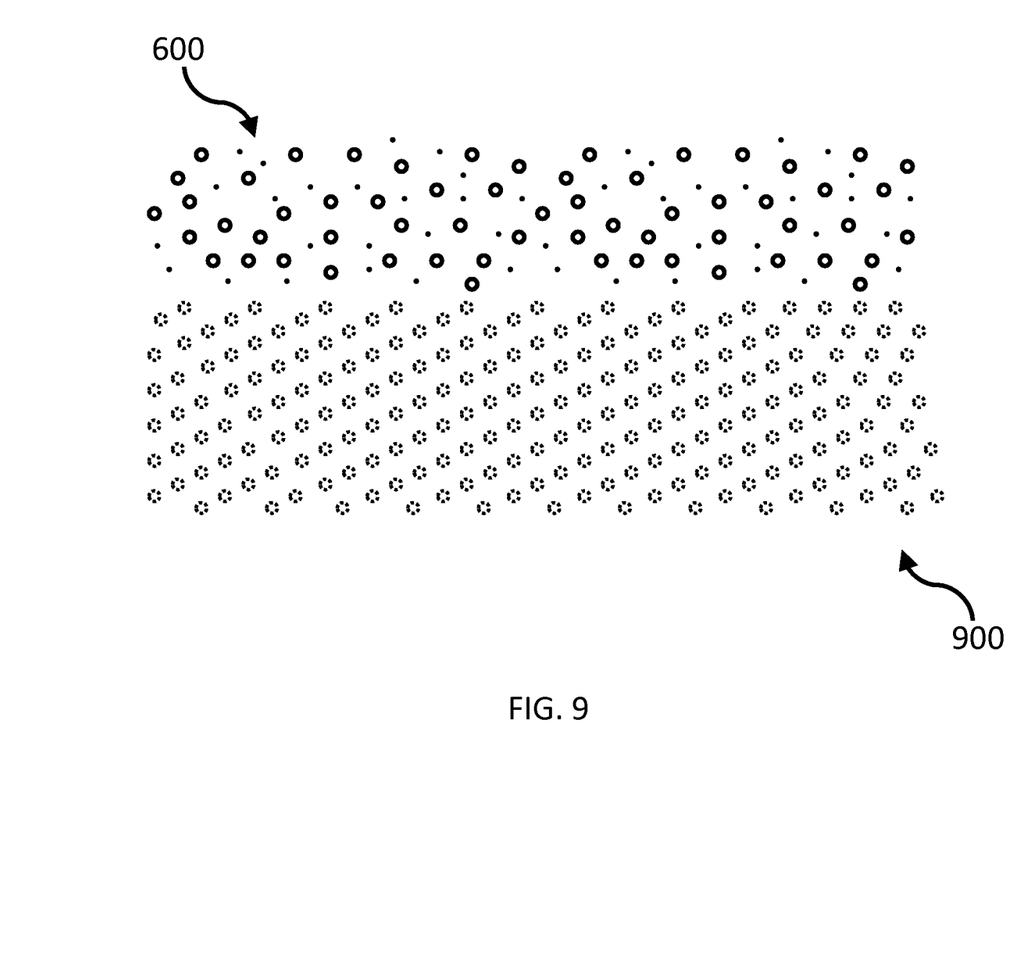
FIG. 9 illustrates an example matrix amendment on a tailings pile implementing the treatment media described herein as a treatment system.

Permeable reactive barriers may be configured as any of a variety of structures, including but not limited to dams. FIG. 7 illustrates an example system including a metals dam as a continuous flow chamber surrounding a contaminated plume. FIG. 8 illustrates an example system including a metals dam surrounding contaminated mine tailings. FIG. 9 illustrates an example matrix amendment system on a tailings pile.

The hydraulic conductivity of the treatment system is configured to vary with the biochar average pore size and average diameter and may be adjusted to cooperate with hydraulic conductivity of the surrounding sub-surface. In an example, the treatment system may have a hydraulic capacity of a 1 mm diameter filter.

Table 2 demonstrates total metals concentrations in a batch system including the treatment media, comparing varying Biochar-to-Bauxsol concentrations at four different sample times. It is noted that in a reference system without biochar, no measurable metals were removed from the drainage.

TABLE 2

Example Analyte Concentration (mq/L)

| Analyte | Al | Cd | Cu | Fe | Mn | Zn |
|---|---|---|---|---|---|---|
| 50% Biochar/50% Bauxsol Mixture | | | | | | |
| Day 6 | 7.75 | 0.001 | 0.0033 | 0.073 | 0.004 | 0.025 |
| Day 11 | 4.71 | 0.001 | 0.0039 | 11.93 | 0.014 | 0.025 |
| Day 16 | 3.64 | 0.001 | 0.0025 | 0.102 | 0.003 | 0.025 |
| Day 23 | 3.78 | 0.001 | 0.0025 | 0.05 | 0.003 | 0.025 |
| 60% Biochar/40% Bauxsol | | | | | | |
| Day 6 | 7.68 | 0.001 | 0.0043 | 0.14 | 0.006 | 0.025 |
| Day 11 | 4.29 | 0.001 | 0.0025 | 0.05 | 0.003 | 0.025 |
| Day 16 | 2.54 | 0.001 | 0.0025 | 0.05 | 0.004 | 0.025 |
| Day 23 | 2.1 | 0.001 | 0.0025 | 0.06 | 0.004 | 0.025 |
| 70% Biochar/30% Bauxsol | | | | | | |
| Day 6 | 9.15 | 0.001 | 0.003 | 0.08 | 0.003 | 0.025 |
| Day 11 | 5.45 | 0.001 | 0.003 | 4.53 | 0.035 | 0.025 |
| Day 16 | 1.3 | 0.001 | 0.0025 | 0.05 | 0.006 | 0.025 |
| Day 23 | 2.7 | 0.001 | 0.0025 | 0.05 | 0.003 | 0.025 |

It is noted that the percent Biochar to Bauxsol is expressed as weight percent for this particular illustration, however, other combinations are possible.

Table 3 demonstrates reduction of metals concentrations in water leaving treatment media comparing varying Biochar-to-Bauxsol concentrations at four different sample times. In all cases, metal contaminants were removed. It is evident that with higher weight portions of biochar, the treatment media was able to continue to effectively reduce metals concentrations at later sample times.

TABLE 3

Percent Reduction of Metal Concentration

| Analyte | Al | Cd | Cu | Fe | Mn | Zn |
|---|---|---|---|---|---|---|
| 50% Biochar/50% Bauxsol | | | | | | |
| Day 6 | 39.7% | 94.6% | 97.1% | 99.7% | 99.6% | 98.3% |
| Day 11 | 63.3% | 94.6% | 96.7% | — | 98.7% | 98.3% |
| Day 16 | 71.7% | 94.6% | 97.8% | 99.6% | 99.8% | 98.3% |
| Day 23 | 70.6% | 94.6% | 97.8% | 99.8% | 99.8% | 98.3% |
| 60% Biochar/40% Bauxsol | | | | | | |
| Day 6 | 40.2% | 94.6% | 96.3% | 99.5% | 99.5% | 98.3% |
| Day 11 | 66.6% | 94.6% | 97.8% | 99.8% | 99.7% | 98.3% |
| Day 16 | 80.2% | 94.6% | 97.8% | 99.8% | 99.7% | 98.3% |
| Day 23 | 83.7% | 94.6% | 97.8% | 99.8% | 99.6% | 98.3% |
| 7% Biochar/30% Bauxsol | | | | | | |
| Day 6 | 28.8% | 94.6% | 97.1% | 99.7% | 99.7% | 98.3% |
| Day 11 | 57.6% | 94.6% | 97.4% | — | 96.9% | 98.3% |
| Day 16 | 89.9% | 94.6% | 97.8% | 99.8% | 99.5% | 98.3% |
| Day 23 | 79.0% | 94.6% | 97.8% | 99.8% | 99.8% | 98.3% |

Although only selected heavy metal removal is illustrated by the tables, it is noted that the treatment media may be used for any of a wide variety of contaminant removal including but not limited to these heavy metals, other heavy metals, other metals, and other contaminants. It is also noted that the data shown in the tables above are shown only for purposes of illustration, and not to limit the treatment media to any particular implementation. The removal efficiencies may vary based on a variety of design considerations, including but not limited to flow rate, initial contaminant concentration, water chemistry, desired effluent, and pre-treatment.

Once treatability is exhausted, the system may be configured to continue to strongly bind with accumulated metals so that the accumulated metals remain bound to the media, thereby reducing potential for reintroduction into waterways.

Figure 10:
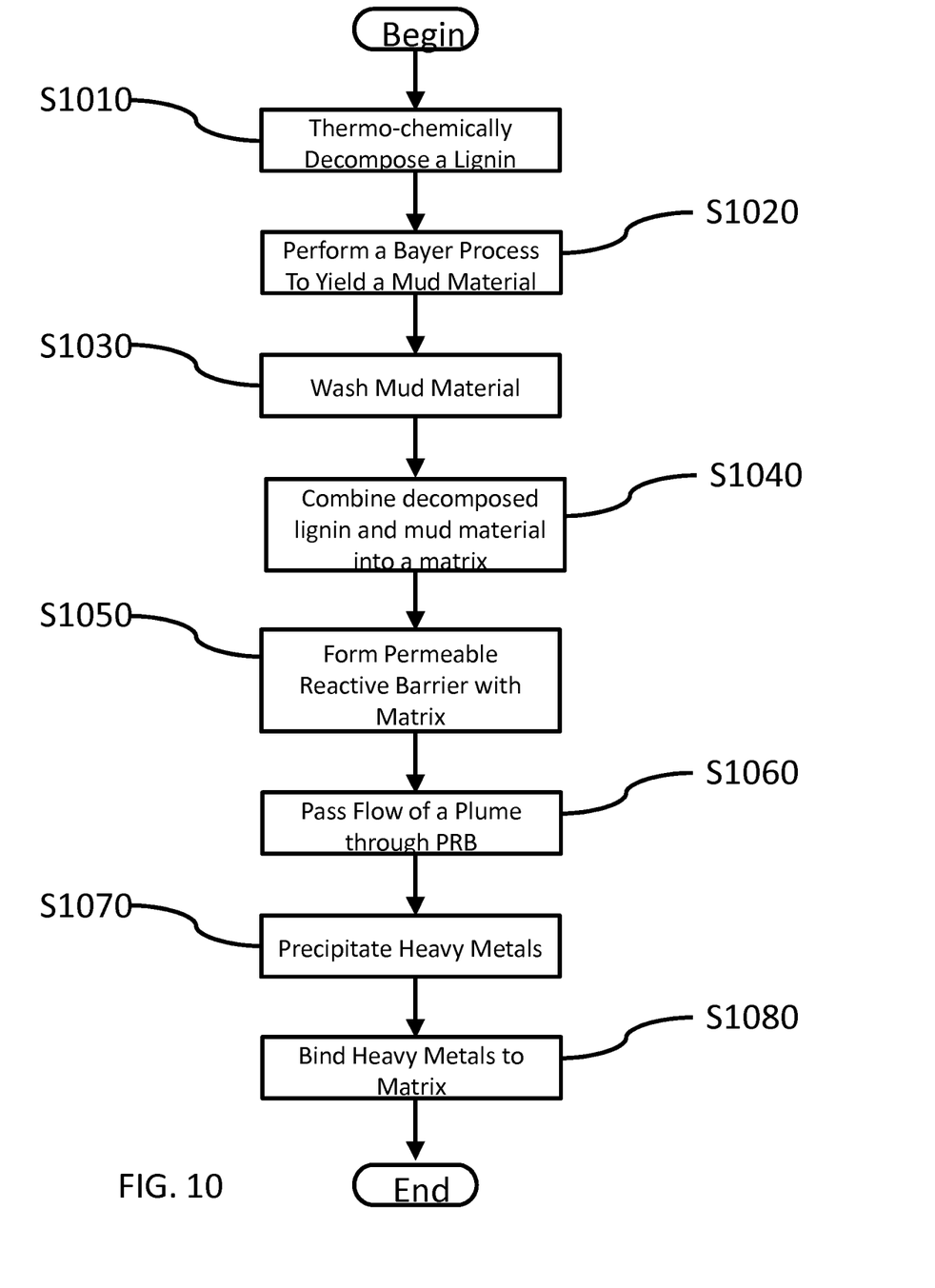
FIG. 10 represents a flow diagram of an example process of treating acid mine drainage.

FIG. 10 represents a flow diagram of an example treatment process (e.g., for treating acid mine drainage). According to step S1010, a biochar fraction is produced. A red mud fraction is produced in step S1020. In an example, the mud material may be washed according to a step S1030. Although specific processes for producing the biochar fraction and red mud fraction are identified in the flow diagram for purposes of illustration, the treatment media is not limited to any particular biochar and/or red mud production processes.

In step S1040, the biochar and red mud fractions are combined into a matrix or treatment media. The matrix may be further incorporated into a structure, such as a permeable reactive barrier through which a contaminant media (e.g., acid mine drainage) may be passed. In an example, the barrier may be used as part of a continuous flow-through system with a minimum contact time, as illustrated according to steps S1050 and S1060. While the minimum contact time may vary in accordance with the effective length of a permeable reactive barrier, in one example a plume maintains contact with the barrier for 30 minutes to effectively remove the contaminant of interest (e.g., heavy metals from acid mine drainage). When acid mine drainage is passed through the system, the total metal concentrations in low pH waters may be reduced both by raising the solution pH and by adsorption of metals such as iron to the surface of the biochar. In an example, the pH of the effluent may be increased by 8 or more.

According to a step S1070, contaminant (e.g., heavy metals) may precipitate out, and according to a step S1080, the contaminant (e.g., the heavy metals) may bind to the red mud and biochar matrix. The resulting effluent achieves removal rates of selected metals by about 60% to 99%, e.g., depending upon contact time, and the relative time between the solution being introduced and chemical breakthrough (i.e., when treatability as been reduced to zero). An example system is configured to reduce total concentrations of aluminum by about 30%-90%, cadmium by about 90%-95%, copper by about 95%-99%, iron by about 95%-99%, lead by about 45%-70%, manganese by about 95%-99% and zinc by about 95%-99%, when metal laden waters are directed through at a rate which allows for sufficient contact time.

Following use, the system's spent media may be disposed of without further treatment. The disposal should only need a place and permit to fill as the material is environmentally benign. For example, the spent media may be used as a soil amendment or placed as a cap on tailings piles.

The operations shown and described herein are provided to illustrate example implementations. It is noted that the operations are not limited to the ordering shown. Still other operations may also be implemented.

The system may be further configured to increase vegetative cover above soils contaminated with heavy metals. In an example, additions of biochar have been shown to increase soil pH by 0.5-1 pH unit. Additions of biochar (30% by volume, 1.6 kg/m$^2$) increase seed germination and increase above ground biomass and vegetative cover. Additions of biochar increase volumetric water content in soils by 10%-15% relative to soil only and straw mulch additions.

Additional mine lands treatment options focus on using carbonaceous sorbents such as biochar to reduce the lability of metals in soils of abandoned mine lands and draining adits of abandoned mine shafts.

The systems and operations shown and described are provided to illustrate example implementations. It is also noted that the implementations are not limited to the example. The implementations shown and described are provided for purposes of illustration and are not intended to be limiting. Still other examples are also contemplated.

The invention claimed is:

1. A treatment media comprising:
   a red mud fraction having a density of greater than approximately 3.4 g/cm$^3$; and
   a biochar fraction having a specific density of less than approximately 1 g/cm$^3$.

2. The treatment media of claim 1, wherein the red mud fraction further comprises a plurality of metal oxides.

3. The treatment media of claim 1, wherein the media binds with at least one of Al, Cd, Cu, Fe, Pb, Mn and Zn.

4. The treatment media of claim 1, further comprising a mass ratio of approximately one part biochar fraction to one part red mud fraction.

5. The treatment media of claim 1, further comprising a mass ratio of approximately two parts biochar fraction to one part red mud fraction.

6. The treatment media of claim 1, wherein the biochar fraction and the red mud fraction is proportioned to reduce total concentrations of Al, Cd, Cu, Fe, Pb, Mn and Zn, from contaminated waters.

7. The treatment media of claim 1, wherein the biochar fraction and the red mud fraction is proportioned to neutralize pH of acid mine drainage waters.

8. The treatment media of claim 1, wherein the biochar fraction has an average diameter greater than about 2 mm and less than about 4 mm.

9. The treatment media of claim 1, wherein the biochar fraction and the red mud fraction is proportioned to reduce metal concentrations until both the adsorptive capacity of the biochar fraction and surface reactivity of the red mud fraction are exhausted.

10. The treatment media of claim 1, wherein the biochar fraction and red mud fraction is proportioned to strongly bind with heavy metals and reduce reintroduction into waterways.

11. The treatment media of claim 1, configured as a vegetative cover for application to soils contaminated with heavy metals.

12. The treatment media of claim 1, wherein the biochar fraction is thermo-chemically decomposed to provide a lignin based material with a carbon weight fraction of at least 80%.

13. The treatment media of claim 1, wherein the red mud fraction is pre-washed.

14. The treatment media of claim 1, wherein the biochar fraction and the red mud fraction are combined by at least mechanical mixing.

* * * * *